UNITED STATES PATENT OFFICE.

GUSTAVUS A. LIEBIG, OF BALTIMORE, MARYLAND, ASSIGNOR TO NAVASSA PHOSPHATE COMPANY OF NEW YORK.

IMPROVEMENT IN THE MANUFACTURE OF SUPERPHOSPHATES.

Specification forming part of Letters Patent No. 49,831, dated September 5, 1865.

*To all whom it may concern:*

Be it known that I, GUSTAVUS A. LIEBIG, of the city and county of Baltimore, and State of Maryland, have made certain new and useful improvements in the transformation of the Navassa guanos and other substances containing phosphate of iron and alumina into a merchantable article of superphosphate; and I do hereby declare the following to be a full, clear, and exact description of the same, sufficient to enable an expert to make use of my invention.

It is well known to manufacturers of superphosphate that Navassa phosphate or any other phosphatic compound containing phosphate of iron or alumina is somewhat intractable in the attempt to transform it into a merchantable article of superphosphate by treatment with sulphuric acid.

My invention consists, first, in the addition of chloride of sodium to the phosphate; second, the substitution, partial or entire, of muriatic acid for the sulphuric acid ordinarily used in the decomposition of the phosphatic material referred to; third, the substitution of sulphurous acid for the sulphuric acid used in the said operation. These three points I call attention to as constituting my invention, the object being to secure a new and economical method of decomposing the said Navassa guano or its related phosphatic compounds into a superphospate.

What I claim as new, and desire to secure by Letters Patent, is—

The use of sulphurous acid, or muriatic acid, or chloride of sodium as a substitute for sulphuric acid in the production of a superphosphate from Navassa guano or other phosphatic compounds.

G. A. LIEBIG.

Witnesses:
E. H. COOPER,
R. W. L. RASIN.